Oct. 18, 1955   J. P. LAWLOR   2,721,173
WATER TREATING APPARATUS
Filed Feb. 23, 1952   2 Sheets-Sheet 2
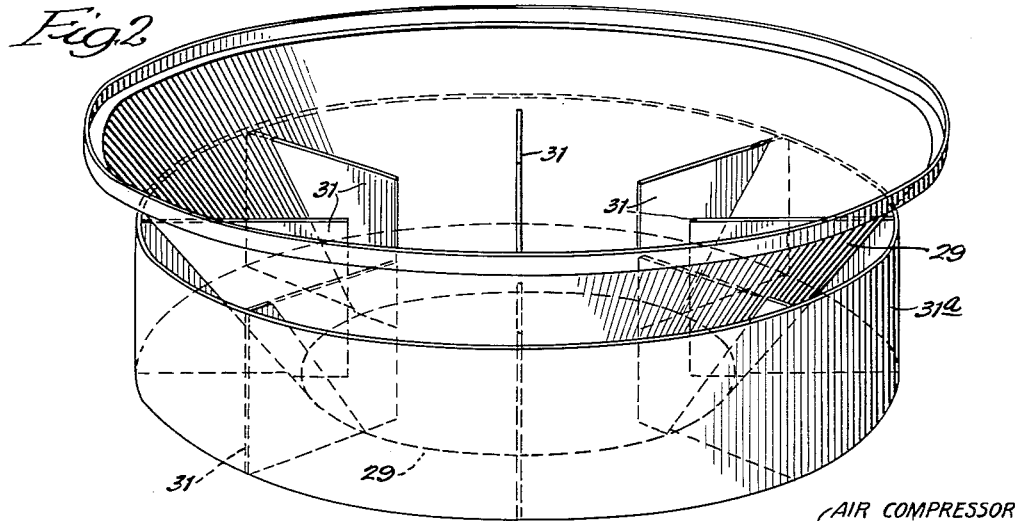
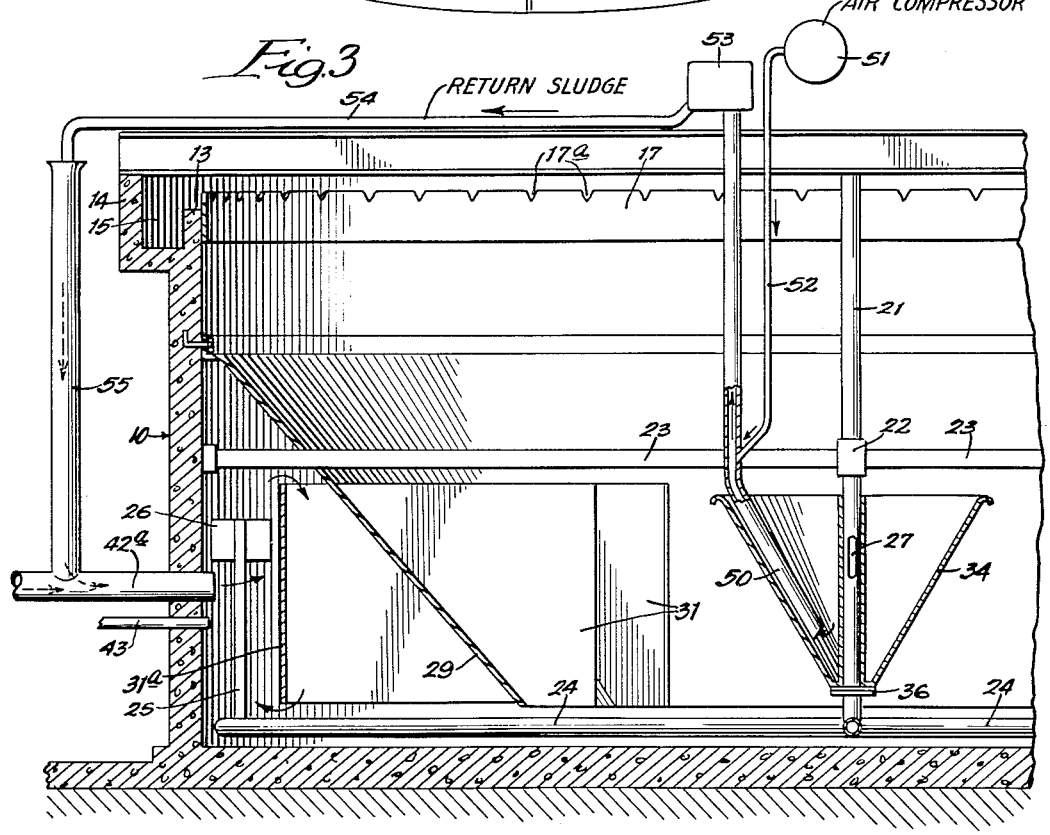
INVENTOR:
Joseph P. Lawlor,
BY
Dawson & Ooms,
ATTORNEYS.

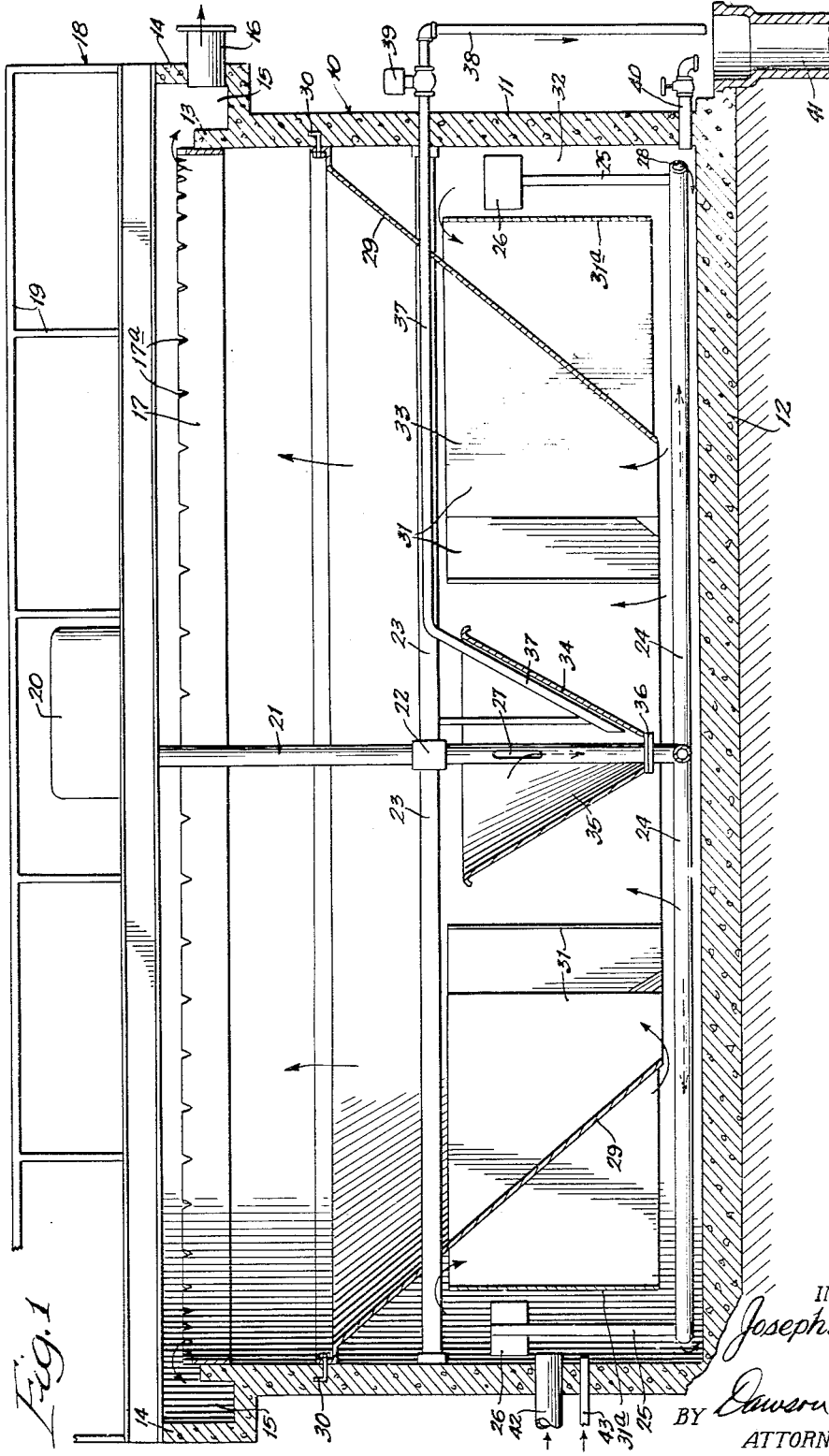

United States Patent Office 2,721,173
Patented Oct. 18, 1955

2,721,173

WATER TREATING APPARATUS

Joseph P. Lawlor, Ames, Iowa, assignor to General Filter Company, Ames, Iowa, a corporation of Iowa Application February 23, 1952, Serial No. 272,954

7 Claims. (Cl. 210—16)

This invention relates to a water treating apparatus.

In the treatment of water, it has been common to carry on the functions of chemical mixing, coagulation, and sedimentation in separate tanks. This was considered necessary to control the individual phases and avoid interference of one stage with another. In my prior Patent No. 2,382,490, issued August 14, 1945, there is shown a separate chamber in which the chemicals were mixed with the water and agitated therewith and the mixture then passed into a separate tank in which the sludge is concentrated and the water treated in contact with the sludge. Such a process is illustrative of the view heretofore held that such treating phases should be separate in order to obtain the best results.

I have discovered, however, that the separate treating steps employed in different vessels have several disadvantages which militate against the effective treatment of the water. The mixing of water in the separate vessels and the passing of it through a pipe into the sedimentation chamber causes the light, small, newly-formed precipitates to form a pinpoint floc which does not tend to aggregate and which makes precipitation extremely difficult. On the other hand, I have discovered that where the chemicals are mixed in a water body in open communication with the sedimentation chamber and sludge chamber, the light, small, newly-formed precipitates are immediately deposited on the old sludge particles and thus weight the old sludge particles. Further, in many chemical processes, I find that the presence of the earlier precipitates have a strong catalytic effect on the new precipitation reactions, resulting in greatly increased activity.

An object of the present invention is to provide apparatus and a method whereby raw water and the chemicals are mixed in a water body which is in open communication with the sedimentation body of water so that there is a gradual passage of new precipitate which is deposited on old sludge particles toward and into the sedimentation chamber. Yet another object is to provide in such a process means for the return of sludge to the mixing zone for contact with newly-formed precipitates. A still further object is to provide means for automatically and regularly removing sludge from the chamber. A still further object is to provide a single vessel in which mixing of the chemicals and raw water is accomplished and in which contact between the sludge and precipitates and water is brought about while constantly removing sludge particles and while carrying away the clarified effluent. A still further object is to provide apparatus and means whereby the introduced raw water is mixed with chemicals under the influence of agitators while the mixture passes therefrom into an inner zone which is rendered quiescent through the use of baffles and a sedimentation is brought about and sludge deposited in a central zone, the clarified effluent being removed from the top of the chamber. Other specific objects and advantages will appear as the specification proceeds.

The invention is shown in an illustrative embodiment by the accompanying drawing, in which—

Figure 1 is a vertical sectional view of apparatus embodying my invention; Fig. 2, a perspective view; and Fig. 3, a broken sectional view showing a modified form of apparatus.

In the illustration given in Figs. 1 and 2, 10 designates a tank having side walls 11 and a bottom wall 12. The tank is provided at its top with a wall 13, forming, with an outwardly-spaced side wall 14, a clarified effluent channel 15 communicating with an outlet 16. The tank may be of any desired shape. In the specific illustration given, the tank 10 is circular and a weir wall 17 is mounted inwardly of the ledge 13 and the weir is provided with spaced overflow notches 17a. On the top of the tank 10 is mounted a frame 18 supporting a handrail 19. Upon the frame 18 is mounted a motor casing 20, in which a motor (not shown) rotates an agitator shaft 21. The shaft 21 is supported in a bearing 22 provided by the crossbeam 23. The lower end of the shaft 21 is connected to hollow agitator arms 24. At the end of each of the arms 24 is mounted a mast 25 carrying an agitator paddle 26.

If desired, the shaft 21 and arms 24 may be formed of solid material. I prefer, however, to have a hollow shaft 21 provided with an elongated inlet 27 adapted to receive sludge, and the shaft 27 communicates with hollow arms 24 provided at their ends with openings or outlets 28. Thus sludge may be conveyed through the shaft 27 and arms 24 and discharged in the area near the masts 25.

Within the tank 10, I support the frustro-conical baffle or wall 29, the upper portion of the wall or baffle being secured to the tank 11 by metal anchors 30. The anchors 30 suspend the inclined wall 29 at a spaced point above the bottom wall 12 of the tank, so that the water may flow from the outside of the baffle 29 to points inside of the baffle.

The baffle 29 is preferably slotted to receive rectangular radial baffles 31, and a portion of each radial baffle 31 extends on the inside of baffle 29 and a portion on the outside thereof. The baffles 31 are attached at their outer ends to a circumferential baffle 31a, and the latter baffle provides an annular space 32 (or mixing zone) through which the masts 25 and the agitator paddles 26 may move in the agitation operation.

The zone 32a between the circumferential baffle 31a and the vertical baffle or partition 29 is a flocculation zone. The zone within the vertical baffle 29 may be called the sedimentation or treating zone.

Secured to the shaft 21 near the bottom thereof is a sludge concentrator cone 34 which provides on the interior thereof a sludge-collecting chamber 35. Apertured plates 36 receive the shaft 21 and the bottom portion of the cone member 34 and secure the cone member to the shaft 21. Thus the cone 34 rotates with shaft 21. If desired, the cone 34 may be made a stationary member and the shaft 21 may be supported for operation within the stationary cone 34.

In order to draw heavy sludge from the cone 34, I provide a draw-off pipe 37 having an opening near the bottom of the cone 34 and extending laterally above the cone to an outlet pipe 38. A solenoid timer valve 39 is preferably provided for intermittently opening the pipe 37. Thus under the head pressure of the liquid within the tank, heavy sludge will be forced outwardly through pipe 37 into outlet pipe 38 when the timer valve 39 is opened. A second draw-off pipe 40 is provided, and this pipe, together with outlet pipe 38, discharges into the sump or drain pipe 41. For certain operations, I prefer to return some of the sludge discharged from pipe 38 into the peripheral chamber 32 of the tank for admixture with the water being freshly treated.

The water and chemicals may be introduced into the outer annular chamber 32 at any desired points. In the illustration given, the raw water inlet is indicated by the numeral 42, and the chemical inlet is indicated by the numeral 43. It will be understood that several pipes 43 may be required for the introduction simultaneously of several chemicals, and the water inlets 32 may be disposed at various points about the annular chamber 32, if desired.

*Operation*

In the operation of the method and apparatus, raw water is introduced through the side of the tank into the baffled mixing zone or chamber 32, where the maximum linear speed of the agitator mast 25 and paddle 26 imparts a violent swirling and tumbling motion. Chemicals are added through the pipe or pipes 43, assuring a rapid chemical reaction in the presence of previously-formed sludge which is constantly being recirculated to this zone from the central concentrator 34. The sludge may be recirculated through the hollow shaft 27 and the hollow arms 24, the rotation of the arms 24 serving to draw the sludge outwardly and discharge it into the outer annular chamber 32. However, the sludge may be taken from the pipe 38 and discharged directly into the outer chamber 32.

The chemically-reacted water passes quickly from the violent mixing zone 32 below or above the circumferential baffle 31a and into the flocculation zone 32a. This occurs before any floc formation proceeds to the point where rapid motion may break it up again. Here the action is gentle and rolling, inducing slow but positive circulation. Thus the chemically-active particles and newly-formed precipitates are continually thrown into contact with the old sludge, promoting complete chemical reactions and large settleable floc formations. The deep radial baffles 31 here overcome the violent swirl of the mixing zone, and, with the relatively slow motion of the agitator arm at this central point, assure proper conditions for good flocculation and uniform distribution.

As the flow continues upwardly through chamber 33, the straightening baffles 31 nullify the motion of the agitator and permit the newly-formed precipitates to be filtered out by the suspended blanket of solids. This suspension of solids maintained by an upward flow of liquid forms an efficient means of classification and clarification. Because the full area of the tank is available at the upper part of the sludge blanket near the top of the partition 29, the upward velocity is minimized, resulting in separation of the water from the finest of precipitates. Effluent turbidities below 5 p. p. m. are obtained with proper chemical treatment and operation.

The peripheral overflow filter weir 17 causes uniform, slow, upward velocities throughout the tank and prevents any short-circuiting that might cause fine solids to carry over.

The sludge concentrator cone 34 provides a pocket at the center of the tank where the lower velocities and relatively quiescent condition promote settling. In the specific illustration given, the cone rotates with the shaft so that the inclined portion of the draw-off pipe 37 provides a slow kneading action which permits water to escape upwardly, resulting in thickening of the sludge. The thickened sludge is drawn to waste at a measured rate by the timer control valve 39 so that a good sludge band is maintained in the clarifier. With this structure, back flushing may be eliminated, and this avoids dilution of the collected sludge.

With the structure and method described, the raw water and chemicals are added in the presence of thoroughly-reacted sludge, resulting in minimum chemical consumption. The sludge blanket extends over the full area of the tank near the top of partition 29, so that the maximum area is utilized in filtration. The upward flow rate is the lowest in the clarification zone because part of the area is not taken away for the mixing operation. The blanket is maintained in proper suspension by upflow and by the action of the agitator. There is an efficient and positive concentration, assuring discharge of sludge at a maximum practical density while minimizing water and chemical waste. There are no high mechanism or flow velocities after flocculation has commenced, as is obtained where large rotors are used, while the action of the agitator operating over the entire tank bottom immediately resuspends the blanket upon start-up, thereby establishing quickly the full effectiveness of sludge blanket operation.

The process and apparatus may be used for any treatment of water in which chemicals are added to produce precipitation or removal of undesired material therein. Lime may be added to reduce the alkalinity and eliminate excessive hardness. Alum or another coagulant, as well as chlorine solution, may be added to clarify and sterilize the water. Soda ash and a variety of other chemicals may be added as precipitating agents, etc.

In the modification shown in Fig. 3, I provide a draw-off pipe 50 and an air lift therefor for returning sludge from the concentrator to an intake portion of the system. In the specific illustration given, air passes from an air compressor 51 through pipe 52 into the draw-off pipe 50 and thence up to a tank 53. Sludge passes from tank 53 through return pipe 54 to the inlet pipe 55, where it joins the raw water intake 42a. In other respects, the structure shown in Fig. 4 is substantially the same as that described in connection with Figs. 1 and 2.

While in the foregoing specification I have shown a specific method and apparatus in considerable detail for the purpose of illustrating an embodiment of the invention, it will be understood that such details of apparatus or method may be varied by those skilled in the art without departing from the spirit of my invention.

I claim:

1. In a water-treating apparatus providing a sedimentation chamber adapted for maintaining a suspended layer of sludge particles therein, means forming a sludge-collecting pocket within said chamber having its mouth opening upwardly and positioned at a level normally below the top of said layer and arranged so that particles of sludge descend into said pocket, said means being mounted for rotation about a vertically-extending axis, a stationary member within said pocket supported and arranged for stirring the sludge within said pocket during the rotation of said pocket thereabout to thicken said sludge as it moves towards the lower portion of said pocket, means for rotating said pocket, and means for withdrawing the thickening sludge from the lower portion of said pocket.

2. In a water-treating apparatus providing a sedimentation chamber adapted for maintaining a sludge blanket therein, a sludge concentrator providing a pocket within said chamber having an upwardly-facing mouth positioned at a level normally within said sludge blanket and arranged so that particles of sludge descend into said pocket, said pocket narrowing in cross-sectional area toward the lower portion thereof, a fixedly-supported elongated member extending into said pocket and arranged for stirring the sludge within said pocket during the rotation of said pocket thereabout to thicken said sludge as it moves toward the lower portion of said pocket, means for rotating said pocket, and means for withdrawing the thickened sludge from the lower portion of said pocket.

3. In a water-treated apparatus providing a sedimentation chamber adapted for maintaining a sludge blanket therein, a sludge concentrator cone mounted base uppermost in said chamber for rotation about its axis, said cone being positioned within said sludge blanket for collecting sludge particles therefrom, a stationary outlet pipe extending into said cone and having an outlet opening communicating with the lower portion thereof, means for rotating said cone on its axis about said outlet pipe, thereby stirring and thickening the sludge as it moves towards the lower portion of said cone for withdrawal through said outlet pipe.

4. The combination of claim 3 in which said outlet pipe has an inclined portion within said cone lying closely adjacent to the inclined wall of said cone.

5. In a water-treating apparatus, a tank having partitioning means therein providing an outer mixing zone for mixing sludge with the water to be treated and an inner sedimentation zone for removing sludge particles from the water, a hollow vertically-extending drive shaft rotatably-mounted in said tank and extending through said sedimentation zone, hollow arms extending outwardly from said drive shaft into said mixing zone, said drive shaft having an inlet opening in the wall thereof above said arms for communicating with said sedimentation zone and said arms communicating with said opening through said drive shaft, means for rotating said shaft and arms in one direction, and outlet means on said arms within said mixing zone having openings facing away from the direction of rotation of said arms for drawing sludge into said mixing zone from said sedimentation zone.

6. The combination of claim 5 in which a cone concentrator is mounted on said drive shaft about said opening therein for rotation with said drive shaft, the bottom of said cone being at a spaced distance below said opening.

7. The combination of claim 6 in which there is also provided an outlet pipe extending into said cone towards the lower portion thereof, said outlet pipe being supported so that it remains stationary during the rotation of said drive shaft and said cone.

References Cited in the file of this patent

UNITED STATES PATENTS

| | | |
|---|---|---|
| Re. 22,194 | Green | Oct. 6, 1942 |
| 2,021,672 | Spaulding | Nov. 19, 1935 |
| 2,127,314 | Spaulding | Aug. 16, 1938 |
| 2,276,300 | Green | Mar. 17, 1942 |
| 2,296,437 | Green | Sept. 22, 1942 |
| 2,366,898 | Gurney | Jan. 9, 1945 |
| 2,368,354 | Green | Jan. 30, 1945 |
| 2,425,372 | Green | Aug. 12, 1947 |
| 2,477,459 | Kelly | July 26, 1949 |